(12) United States Patent
Shirayama et al.

(10) Patent No.: US 12,273,648 B2
(45) Date of Patent: Apr. 8, 2025

(54) IMAGE CAPTURE APPARATUS AND CONTROL METHOD THEREFOR

(71) Applicant: CANON KABUSHIKI KAISHA, Tokyo (JP)

(72) Inventors: Kazuhisa Shirayama, Tokyo (JP); Toshimichi Ise, Kanagawa (JP); Kazuya Kitamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 18/356,356

(22) Filed: Jul. 21, 2023

(65) Prior Publication Data

US 2024/0040072 A1 Feb. 1, 2024

(30) Foreign Application Priority Data

Jul. 26, 2022 (JP) .................. 2022-118874

(51) Int. Cl.
*H04N 5/268* (2006.01)
*H04N 7/08* (2006.01)
*H04N 23/63* (2023.01)
*H04N 23/667* (2023.01)

(52) U.S. Cl.
CPC ............. *H04N 5/268* (2013.01); *H04N 7/08* (2013.01); *H04N 23/631* (2023.01); *H04N 23/667* (2023.01)

(58) Field of Classification Search
None
See application file for complete search history.

(56) References Cited

U.S. PATENT DOCUMENTS

| 9,210,325 | B2 | 12/2015 | Hashiguchi | |
|---|---|---|---|---|
| 2015/0201122 | A1* | 7/2015 | Ooba | H04N 23/633 348/333.05 |
| 2016/0360142 | A1* | 12/2016 | Hashiguchi | H04N 23/69 |
| 2021/0360172 | A1* | 11/2021 | Liu | H04N 5/265 |

FOREIGN PATENT DOCUMENTS

JP 2020-127245 A 8/2020

OTHER PUBLICATIONS

European Search Report issued on Dec. 11, 2023, which is enclosed, that issued in the corresponding European Patent Application No. 23185776.4.

* cited by examiner

*Primary Examiner* — Paul M Berardesca

(74) *Attorney, Agent, or Firm* — Cowan, Liebowitz & Latman, P.C.

(57) ABSTRACT

An image capture apparatus comprises an image sensor and an output interface that selectively outputs a main video stream obtained using the image sensor and a sub video stream input from outside. The image capture apparatus changes a resolution of the main video stream to be equal to a resolution of the sub video stream in a case where an output of the sub video stream from the output interface has been set to be enabled.

13 Claims, 7 Drawing Sheets

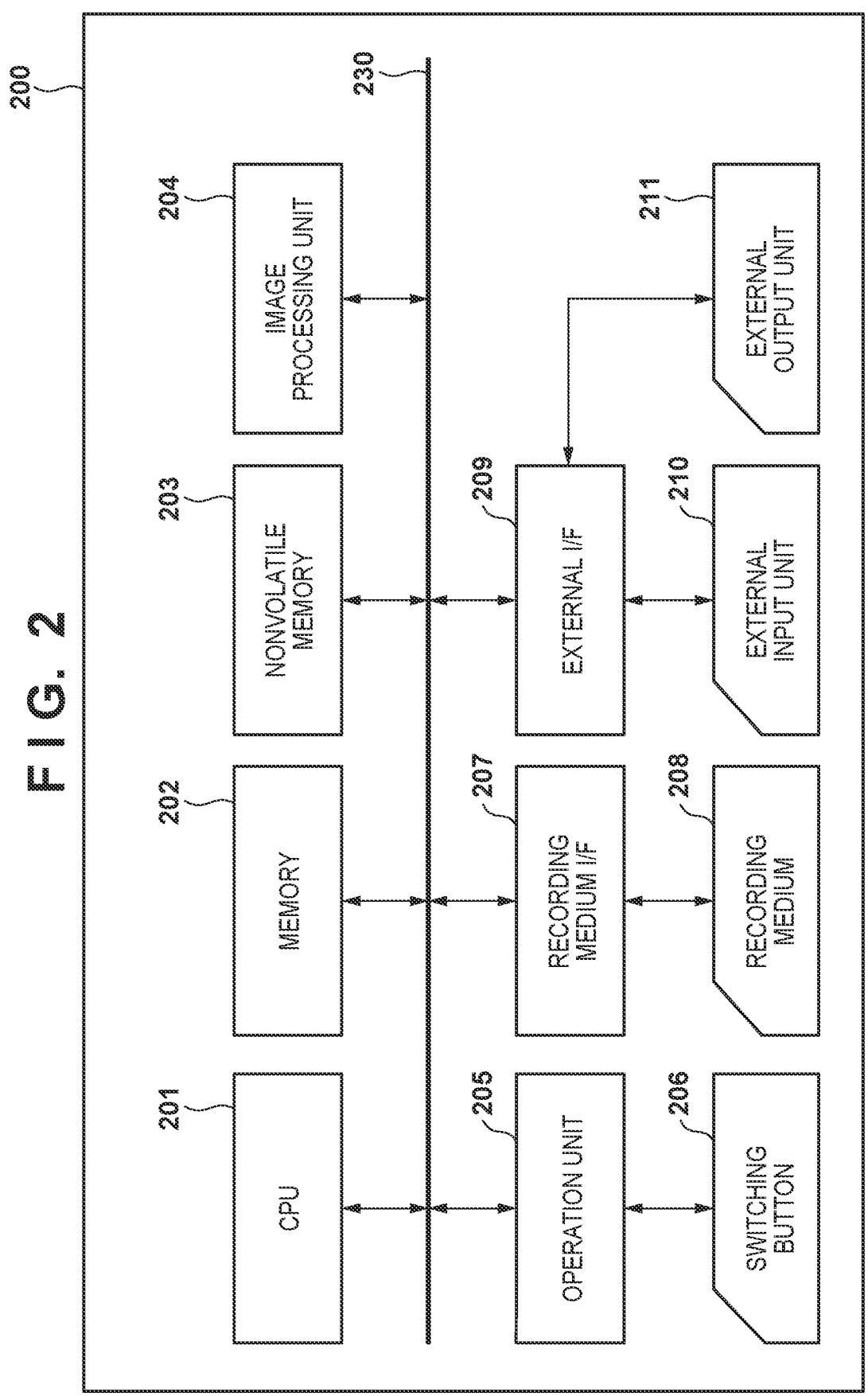

IMAGE CAPTURE APPARATUS AND CONTROL METHOD THEREFOR

BACKGROUND OF THE INVENTION

Field of the Invention

The present invention relates to an image capture apparatus and a control method therefor.

Description of the Related Art

Some image capture apparatuses that are used in, for example, television broadcasting have a function of displaying a video stream input from the outside, such as a video stream output by another image capture apparatus and a video stream that is currently broadcast (Japanese Patent Laid-Open No. 2020-127245). Such a video stream input from the outside is referred to as a return video stream, whereas a video stream that an image capture apparatus shoots and outputs on its own is referred to as a main video stream. An image capture apparatus described in Japanese Patent Laid-Open No. 2020-127245 displays a main video stream and a return video stream on separate display apparatuses so as to allow a user to confirm these video streams in parallel.

The number of display apparatuses and the size of an image capture system can be reduced by displaying the main video stream and the return video stream on one display apparatus, either simultaneously or in a switchable manner. However, in a case where the main video stream and the return video stream are displayed on one display apparatus, it is necessary to switch the video stream formats and/or the settings of the display apparatus in accordance with the video stream(s) to be displayed. Therefore, a time lag can occur from when an instruction for switching the displayed video streams is issued to when the display is switched. In a case where the displayed video streams are frequently switched, there is a possibility that the usability is decreased by this time lag.

SUMMARY OF THE INVENTION

The present invention according to one aspect thereof provides an image capture apparatus capable of quickly switching video streams displayed on a display apparatus, and a control method therefor.

According to an aspect of the present invention, there is provided an image capture apparatus, comprising: an image sensor; an output interface that selectively outputs a main video stream obtained using the image sensor and a sub video stream input from outside; and one or more processors that execute a program stored in a memory and thereby function as a control unit configured to: change a resolution of the main video stream to be equal to a resolution of the sub video stream in a case where an output of the sub video stream from the output interface has been set to be enabled, and not change the resolution of the main video stream in a case where the output of the sub video stream from the output interface has not been set to be enabled.

According to another aspect of the present invention, there is provided a control method executed by an image capture apparatus that includes an image sensor and an output interface that selectively outputs a main video stream obtained using the image sensor and a sub video stream input from outside, the control method comprising: determining whether an output of the sub video stream from the output interface has been set to be enabled; changing a resolution of the main video stream to be equal to a resolution of the sub video stream in a case where it is determined that the output of the sub video stream from the output interface has been set to be enabled; and making no change to the resolution of the main video stream in a case where it is determined that the output of the sub video stream from the output interface has not been set to be enabled.

According to a further aspect of the present invention, there is provided a non-transitory computer-readable medium storing a program for causing, when executed by a computer included in an image capture apparatus that includes an image sensor and an output interface that selectively outputs a main video stream obtained using the image sensor and a sub video stream input from outside, the computer to execute a control method comprising: determining whether an output of the sub video stream from the output interface has been set to be enabled; changing a resolution of the main video stream to be equal to a resolution of the sub video stream in a case where it is determined that the output of the sub video stream from the output interface has been set to be enabled; and making no change to the resolution of the main video stream in a case where it is determined that the output of the sub video stream from the output interface has not been set to be enabled.

Further features of the present invention will become apparent from the following description of exemplary embodiments (with reference to the attached drawings).

BRIEF DESCRIPTION OF THE DRAWINGS

FIG. 2 is a block diagram showing exemplary functional constituents of an extension unit that can be connected to the image capture apparatus according to an embodiment.

DESCRIPTION OF THE EMBODIMENTS

Figure 1:
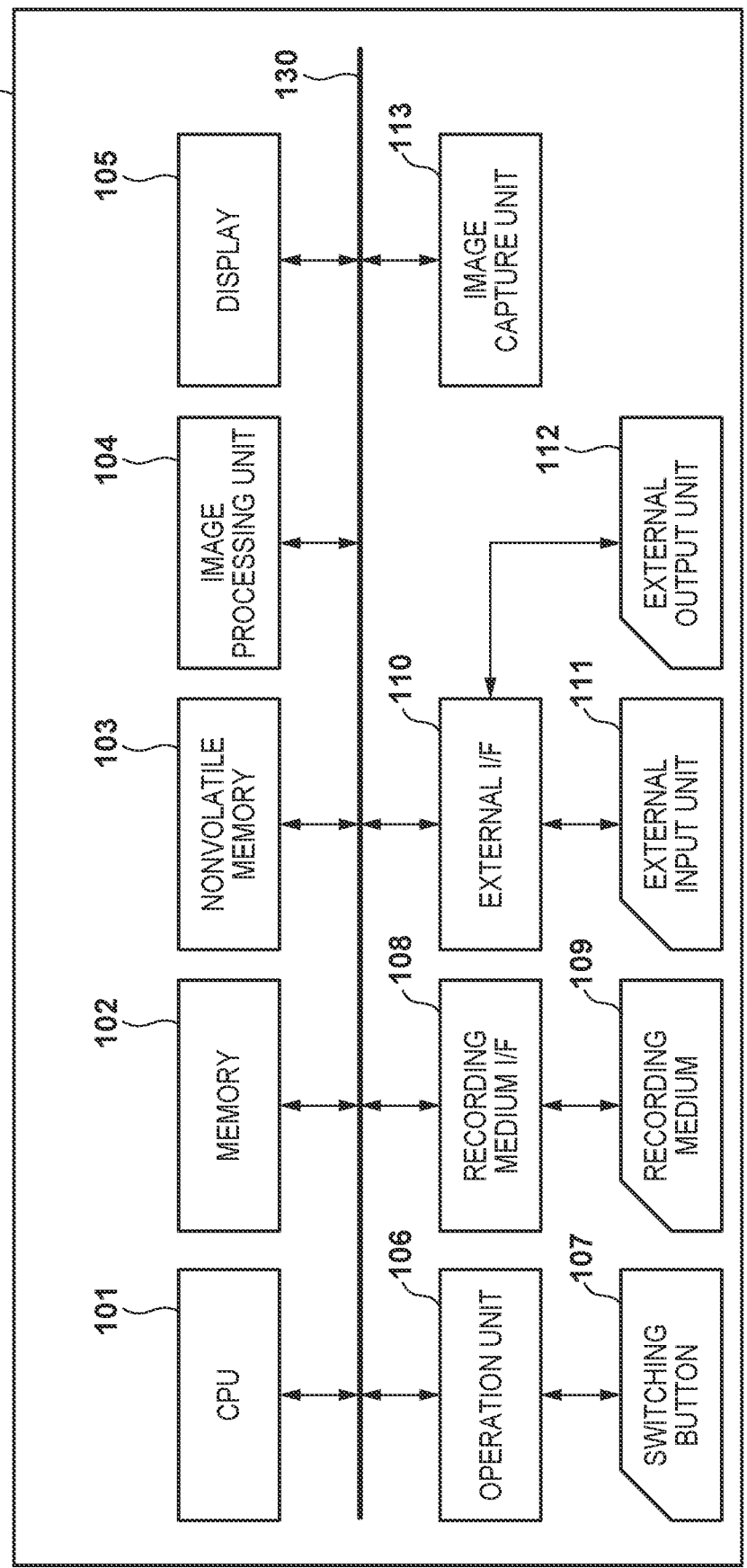
FIG. 1 is a block diagram showing exemplary functional constituents of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiment will be described in relation to a case where the present invention is embodied on an image capture apparatus similar to a video camera. However, the present invention can also be embodied on any electronic device that has an image capture function and a function related to an external input of video signals. Examples of such an electronic device include a computer device (a personal computer, a tablet computer, a media player, a PDA, or the like), a smartphone, and a game device, in addition to an image capture apparatus. These are examples, and the present invention can also be embodied on other electronic devices.

FIG. 1 is a block diagram showing exemplary functional constituents of an image capture apparatus 100 according to an embodiment of the present invention. Functional blocks that are connected to an internal bus 130 can communicate data and control signals with one another via the internal bus 130.

A memory 102 may be, for example, a volatile memory, such as a DRAM. The memory 102 is used in processing of a CPU 101 and an image processing unit 104. Furthermore, the memory 102 is also used as a buffer memory for captured images, and a video memory of a display 105.

A nonvolatile memory 103 is typically a semiconductor memory, such as an EEPROM. However, the nonvolatile memory 103 can include a storage apparatus, such as a hard disk. The nonvolatile memory 103 stores, for example, a program executed by the CPU 101, the setting values of the image capture apparatus 100, and graphical user interface (GUI) data used for a menu screen and the like.

The CPU 101 represents one or more microprocessors capable of executing the program. The CPU 101 loads the program stored in the nonvolatile memory 103 to the memory 102, and executes the program. The CPU 101 realizes various types of functions of the image capture apparatus 100, including later-described display control processing, by controlling the operations of each functional block in accordance with the program.

The image processing unit 104 generates signals and image data that suit the intended use, and obtains and/or generates various types of information, by applying preset image processing to image data stored in the memory 102. The image processing unit 104 may be a dedicated hardware circuit, such as an application specific integrated circuit (ASIC), that has been designed to, for example, realize specific functions. Alternatively, the image processing unit 104 may be configured to realize specific functions as a result of the execution of software by a processor, such as a digital signal processor (DSP) and a graphics processing unit (GPU). The image processing unit 104 outputs information and data that have been obtained or generated to the CPU 101, the memory 102, and the like in accordance with the intended use.

The image processing applied by the image processing unit 104 can include, for example, preprocessing, color interpolation processing, correction processing, detection processing, data editing processing, evaluation value calculation processing, special effects processing, and so forth.

The preprocessing can include signal amplification, reference level adjustment, defective pixel correction, A/D conversion, and so forth.

The color interpolation processing is processing which is executed in a case where color filters are provided in an image sensor, and which is intended to interpolate the values of color components that are not included in discrete pieces of pixel data that compose image data. The color interpolation processing is also referred to as demosaicing processing.

The correction processing can include such processing as white balance adjustment, tone correction, correction of image deterioration caused by optical aberration of an image capture optical system (image recovery), correction of the influence of vignetting of the image capture optical system, and color correction.

The detection processing can include detection of a characteristic area (a face area, a human body area, or the like) and a motion therein, processing for recognizing a person, and so forth.

The data editing processing can include such processing as conversion of a signal format, cutout of an area (cropping), composition, scaling (resolution conversion), encoding and decoding, and generation of file data that stores image data. Generation of image data for display and image data for recording is also included in the data editing processing.

The evaluation value calculation processing can include such processing as generation of signals and evaluation values used in automatic focus detection (AF), and generation of evaluation values used in automatic exposure control (AE). AF processing and AE processing are executed by the CPU 101.

The special effects processing can include such processing as addition of blur effects, alteration of shades of colors, relighting, and so forth.

Note that these are examples of processing that can be applied by the image processing unit 104, and do not limit processing applied by the image processing unit 104.

Under control of the CPU 101, the display 105 displays a main video stream, a sub video stream (a return video stream), a video stream stored in a recording medium 109, and so forth. The display 105 also displays, for example, a GUI screen for confirming and changing the setting values of the image capture apparatus 100, such as a menu screen. The CPU 101 selectively outputs one of a main video stream and a return video stream to the display 105 in accordance with an operation on a switching button 107, which will be described later.

FIG. 1 shows the display 105 as a constituent built in the image capture apparatus 100. However, the display 105 may be an external apparatus. In a case where the display 105 is an external apparatus, the image capture apparatus 100 outputs, to an interface connected to the display 105, video signals to be displayed on the display 105.

An operation unit 106 includes one or more input devices that accept a user operation, such as a keyboard, a mouse, a dial, a joystick, a touch sensor, and a touchpad. In a case where the display 105 is a touch display, a touch panel included in the display 105 is included in the operation unit 106. The switching button 107 for switching a video stream to be displayed on the display 105 or an external display apparatus between a return video stream and a main video stream, which will be described later, is also included in the operation unit 106. Note that it is permissible to provide switching buttons 107 respectively for video stream output systems.

Note that the touch panel outputs whether a contact has been made, and the coordinates at which the contact has been detected. The CPU 101 can also recognize a known gesture input, such as a flick, in accordance with an output from the touch panel. The CPU 101 monitors an operation performed on an input device included in the operation unit 106, and upon detection of the operation, executes a function allocated to the operated input device and an operation corresponding to the operation.

A recording medium I/F 108 is an interface for accessing the attachable/removable recording medium 109, which is a memory card or the like. The CPU 101 records image data for recording that has been generated by the image processing unit 104 and stored in the memory 102 into the recording medium 109 via the recording medium I/F 108. Furthermore, the CPU 101 reads out image data recorded in the recording medium 109, and stores the same into the memory 102.

An external I/F 110 is a communication interface with an external device. The external I/F 110 complies with one or more communication standards, and includes connectors and transmission/reception devices that are in conformity with the communication standards. Typical communication standards include a universal serial bus (USB), a high-definition multimedia interface (HDMI®), and a serial digital interface (SDI). Note that the external I/F 110 may comply with such wireless communication standards as a wireless LAN and Bluetooth®. Furthermore, a later-described extension unit is connected to the external I/F 110. Input and output of video signals, sound signals, and control signals are performed between the CPU 101 and an external device via the external I/F 110.

An external input unit 111 is, for example, an SDI terminal or an HDMI terminal. A return video stream (a sub video stream) can be input to the external input unit 111. An external output unit 112 is, for example, an SDI terminal or an HDMI terminal. The CPU 101 can selectively output one of a main video stream and a return video stream from the external output unit 112 in accordance with an operation on the later-described switching button 107.

An image capture unit 113 is a camera unit that includes a shooting optical system, an image sensor such as a CCD sensor and a CMOS sensor, a shutter, a diaphragm, and the like. The shooting optical system includes movable lenses such as a zoom lens and a focus lens. The image capture unit 113 also includes such peripheral circuits as a driving circuit that drives the diaphragm and movable lenses, a timing generator that controls the operations of the image sensor, and an A/D converter that applies A/D conversion to analog image signals that have been read out from the image sensor. The operations of the image capture unit 113 are controlled by the CPU 101. The image capture unit 113 sequentially stores pieces of image data that have been obtained through shooting into the memory 102.

FIG. 2 is a block diagram showing exemplary functional constituents of an extension unit 200 that extends the functions of the image capture apparatus 100. The extension unit 200 may be directly connected to the external I/F of the image capture apparatus 100, or may be indirectly connected to the external I/F of the image capture apparatus 100 via another extension unit. Note that an extension of functions may be an addition of new functions, or may be an enhancement of existing functions.

The extension unit 200 includes the functional constituents of the image capture apparatus 100, except for the display and the image capture unit. The operations of the functional blocks shown in FIG. 2 are the same as the operations of the functional blocks of the same names in FIG. 1, and thus a description of the discrete functional blocks is omitted. Note that although the image capture apparatus 100 and the extension unit 200 may include the functional blocks of the same names, the functional blocks included in the extension unit 200 can be more multifunctional and/or offer higher performance.

Note that the extension unit can include a plurality of external I/Fs 209. In this case, the image capture apparatus 100 can be connected to one of the external I/Fs 209, and another extension unit can be connected to another one of them. In this way, a plurality of extension units can be connected to the image capture apparatus 100.

Figure 3A:
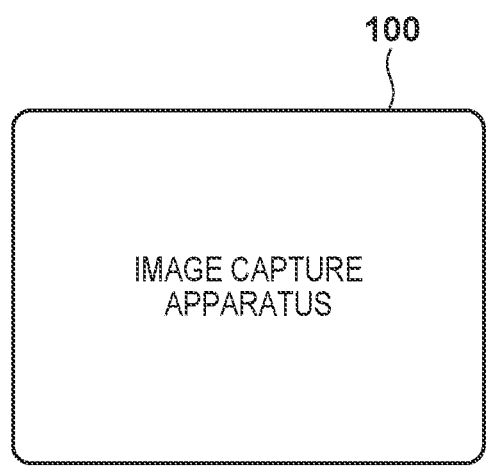
FIGS. 3A and 3B are schematic diagrams related to the forms of connection between the image capture apparatus and the extension unit.
Figure 3B:
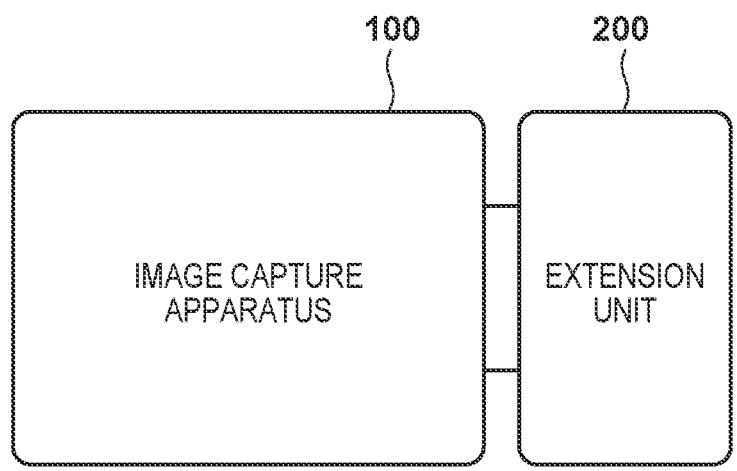

FIGS. 3A and 3B are diagrams showing examples of a connection pattern between the image capture apparatus 100 and the extension unit 200. FIG. 3A shows a state where only the image capture apparatus 100 is present. FIG. 3B is a diagram showing a state where the extension unit 200 has been connected to the image capture apparatus 100. The extension unit 200 and the image capture apparatus 100 can be connected to each other by connecting the external I/F 110 of the image capture apparatus 100 and the external I/F 209 of the extension unit 200 to each other.

The operations that will be hereinafter described to be executed on the image capture apparatus 100 in relation to the external input unit 111 and the external output unit 112, can also be executed with respect to any one of the following combinations:

an external input unit 210 and an external output unit 211 of the extension unit 200,
  the external input unit 111 of the image capture apparatus 100 and the external output unit 211 of the extension unit 200, and
  the external input unit 210 of the extension unit 200 and the external output unit 112 of the image capture apparatus 100.

Similarly, in a case where a plurality of extension units 200 are connected to the image capture apparatus 100, the operations can be executed with respect to any combination of an external input unit and an external output unit.

Figure 4:
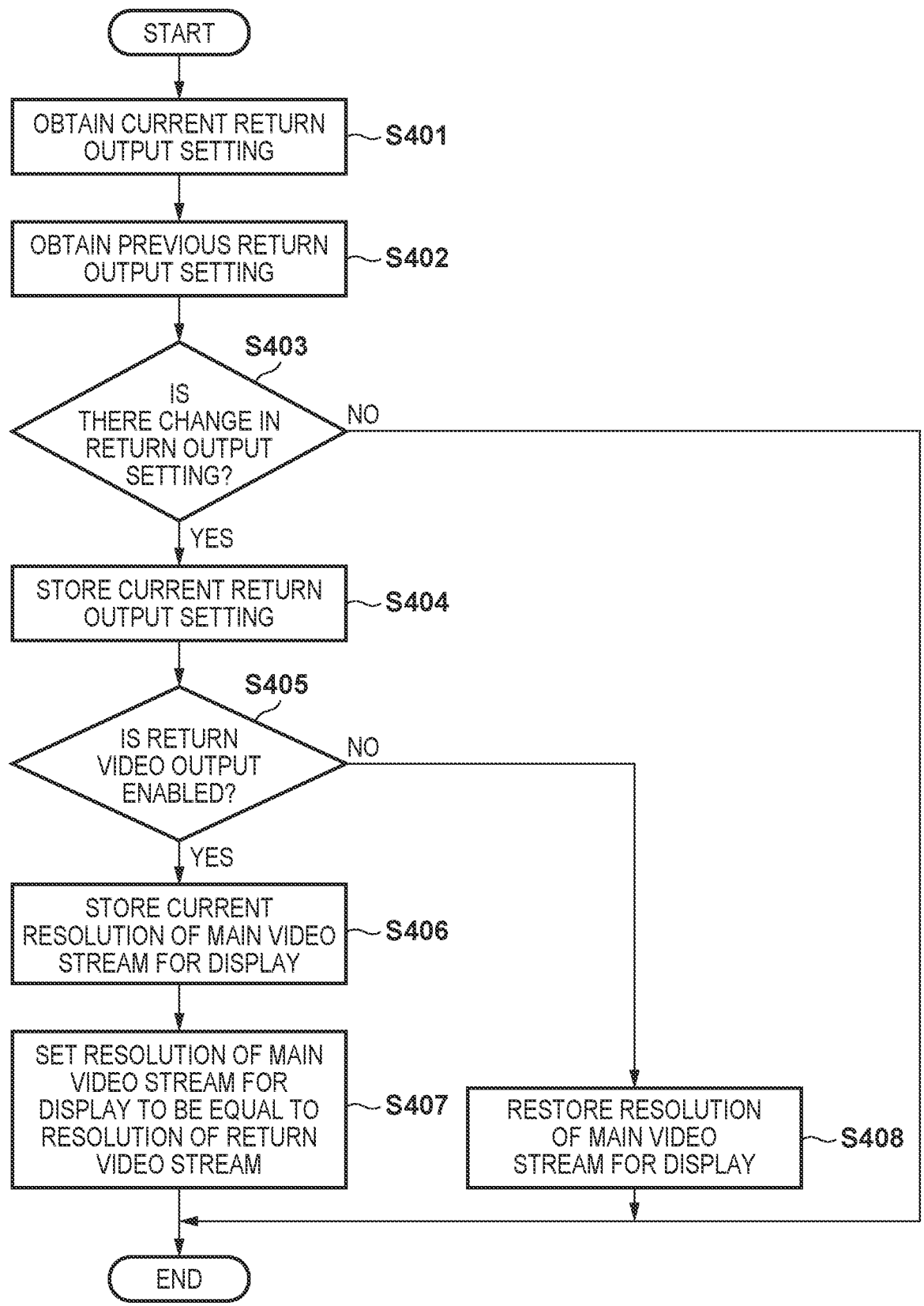
FIG. 4 is a flowchart showing an example of automatic control processing for a resolution according to an embodiment.

Next, using a flowchart shown in FIG. 4, a description is given of processing in which the CPU 101 performs automatic control on the resolution of a main video stream that is output from the image capture apparatus 100 to a display apparatus. Note that a main video stream for which the resolution is controlled here is a main video stream to be displayed on the display apparatus connected to the image capture apparatus 100 or the extension unit 200. The resolution of a main video stream that is output to a switcher or used in recording is not changed in the present processing. Therefore, in the following description, a main video stream output from the external output unit 112 is a main video stream output to an external display apparatus connected to the external output unit 112. Furthermore, the resolution of a main video stream output to the display 105, too, can be controlled as the resolution of a main video stream for display output from the external output unit 112. In the following description, a display apparatus refers to both of the display 105 and the external display apparatus.

Note that the resolution of the main video stream for display may be set by a user, instead of being under automatic control by the CPU 101. Whether to place the resolution of the main video stream for display under automatic control or under user settings may be changeable by the user via, for example, a menu screen. The CPU 101 can control the resolution of the main video stream by controlling pixels to be read out from the image sensor, whether to use pixel-binning, and so forth.

In a case where the resolution of the main video stream for display is placed under automatic control, the CPU 101 controls the resolution of the main video stream for display in accordance with whether the output of a return video stream has been set to be "enabled" (a state where the return video stream can be displayed on the display apparatus). Specifically, in a case where the output of the return video stream has not been set to be "enabled" (has been set to be "disabled"), the CPU 101 does not change the resolution of the main video stream for display, regardless of the resolution of the return video stream.

On the other hand, in a case where the output of the return video stream has been set to be "enabled", the CPU 101 changes the resolution of the main video stream for display to be the same as the resolution of the return video stream. As a result, when a video stream displayed on the display apparatus is switched between the main video stream and the return video stream, the conversion of resolutions of the video streams and the display apparatus does not occur. Therefore, the video streams can be quickly switched, and the usability is improved.

Automatic control processing for the resolution of the main video stream for display can be executed at various timings. For example, these timings include, but are not limited to, the time of activation of the image capture apparatus 100, the time of configuration of a setting related to the output of the return video stream via an output setting screen of FIGS. 7A and 7B (described later), the time of detection of the input of the return video stream to the external input unit 111, a user operation performed via a menu screen, and so forth.

In step S401, the CPU 101 reads in a current return output setting stored in the memory 102. Note that the CPU 101 may read in the current return output setting from the nonvolatile memory 103 or the recording medium 109.

Next, in step S402, the CPU 101 reads in a previous return output setting that was stored into the memory 102 in step S404 that has been executed most recently. Note that in a case where automatic control processing for the resolution of the main video stream for display is executed for each display apparatus, the CPU 101 reads in a previous return output setting that was stored into the memory 102 in step S404 that has been executed most recently with respect to a display apparatus that is currently targeted for the processing. Note that the CPU 101 may read in the previous return output setting from the nonvolatile memory 103 or the recording medium 109, similarly to the current return output setting. Furthermore, for example, in a case where the previous return output setting does not exist, the CPU 101 may skip step S402 and execute step S403.

In step S403, the CPU 101 compares the current return output setting obtained in step S401 with the previous return output setting obtained in step S402, and determines whether they are the same. If it is determined that they are the same (the return output setting has not changed), the CPU 101 ends the automatic control processing without changing the resolution of the main video stream for display. On the other hand, if it is determined that they are not the same (the return output setting has changed), the CPU 101 executes step S404. Note that in a case where step S402 has not been executed, or in a case where the previous return output setting was not able to be obtained in step S402, the CPU 101 regards that the return output setting has changed, and executes step S404.

In step S404, the CPU 101 updates the previous return output setting stored in the memory 102 (or the nonvolatile memory 103 or the recording medium 109) using the current return output setting obtained in step S401. In a case where the previous return output setting is not stored, it is sufficient to simply store the current return output setting. Note that in a case where step S402 is not executed, step S404 may not be executed, either.

In step S405, the CPU 101 determines whether the current return output setting obtained in step S401 is "enabled"; it executes step S406 if it is determined that the return output setting is enabled, and executes step S408 if it is not thus determined.

In step S406, the CPU 101 stores the resolution of the main video stream for display to be output from the external output unit 112 into the memory 102 (or the nonvolatile memory 103 or the recording medium 109). Note that step S407 may be executed without executing step S406.

In step S407, the CPU 101 sets the resolution of the main video stream for display to be output from the external output unit 112 to be equal to the resolution of the return video stream, and ends the automatic control processing for the resolution. Thereafter, the CPU 101 outputs the main video stream from the external output unit 112 at the resolution that has been set, that is to say, the same resolution as the return video stream. Note that the resolution of the return video stream can be obtained from the return video stream that has been input to the external input unit 111. Furthermore, the resolution of the return video stream that has been obtained may be stored into the nonvolatile memory or the recording medium 109, and the stored resolution may be referenced from the next time. In addition, the resolution of the return video stream may be input by the user. The CPU 101 may obtain the resolution of the return video stream using other methods.

There is a case where a setting has been configured whereby the resolution of the video stream for display to be output from the external output unit 112 is linked to the resolution of a display apparatus that acts as an output destination. In this case, the CPU 101 first disables the link between the resolutions, and then changes the resolution of the main video stream for display.

Furthermore, the CPU 101 may determine whether an apparatus that acts as an output destination of the main video stream is a display apparatus, and cause the resolution of the main video stream to coincide with the resolution of the return video stream only in a case where it is determined that the apparatus is the display apparatus.

In addition, whether to place the resolution of the main video stream for display under automatic control may be settable for each output system (terminal). In this case, the CPU 101 does not change the resolution with respect to the main video stream to be output from an output system in which automatic control on the resolution has not been set to be enabled.

In step S408, the CPU 101 sets (restores) the resolution of the main video stream for display to be output from the external output unit 112 at the resolution before it is made to coincide with the resolution of the return video stream, and ends the automatic control processing for the resolution. Thereafter, the CPU 101 outputs the main video stream from the external output unit 112 at the resolution that has been set (restored). The resolution before it is made to coincide with the resolution of the return video stream is, for example, the resolution that has been stored in step S406 most recently. Note that in a case where the obtainment of the resolution of the external output unit has failed at the time of the most recent execution of step S406, the CPU 101 may end processing for setting the resolution of the external output unit without executing processing of step S408.

Note that instead of determining whether the return output setting has changed in steps S401 to S403, whether the return video stream has been input to the external input unit 111 may be determined.

In a case where the return video stream has been input to the external input unit 111, the CPU 101 can execute step S407 and set the resolution of the input return video stream as the resolution of the main video stream for display.

On the other hand, in a case where the return video stream has not been input to the external input unit 111, too, the CPU 101 can execute step S407. However, in this case, the CPU 101 can set the resolution of the return video stream that has been input most recently, or the resolution of the return video stream that has been input by the user (1920× 1080, 2048×1080, or the like), as the resolution of the main video stream for display.

Note that in a case where, for example, a plurality of display apparatuses are connected to the image capture apparatus 100, and different display apparatuses can switch between different return video streams and the main video stream during display, the CPU 101 may execute the automatic control processing for the resolution of the main video stream for display for each display apparatus or each return video stream.

As described above, the automatic control processing for the resolution of the main video stream is executed, and the main video stream is output at the same resolution as the return video stream. Thereafter, in accordance with the issuance of an instruction for switching from the main video stream to the return video stream in accordance with an operation on the switching button 107, the output of the main video stream is switched to the output of the return video stream. At this time, as the main video stream and the return video stream have the same resolution, processing for changing the resolution is not necessary when switching to the output of the return video stream; therefore, the video streams can be quickly switched.

In the processing of FIG. 4, steps S401 and S402 may be executed at the time of activation, whereas step S403 onward may be executed at other timings. For example, processing of step S403 onward may be executed in a case where a setting of an interface (terminal) that outputs the return video stream or a setting for enabling/disabling the output of the return video stream has been changed by a user operation via a menu screen.

Figure 5:
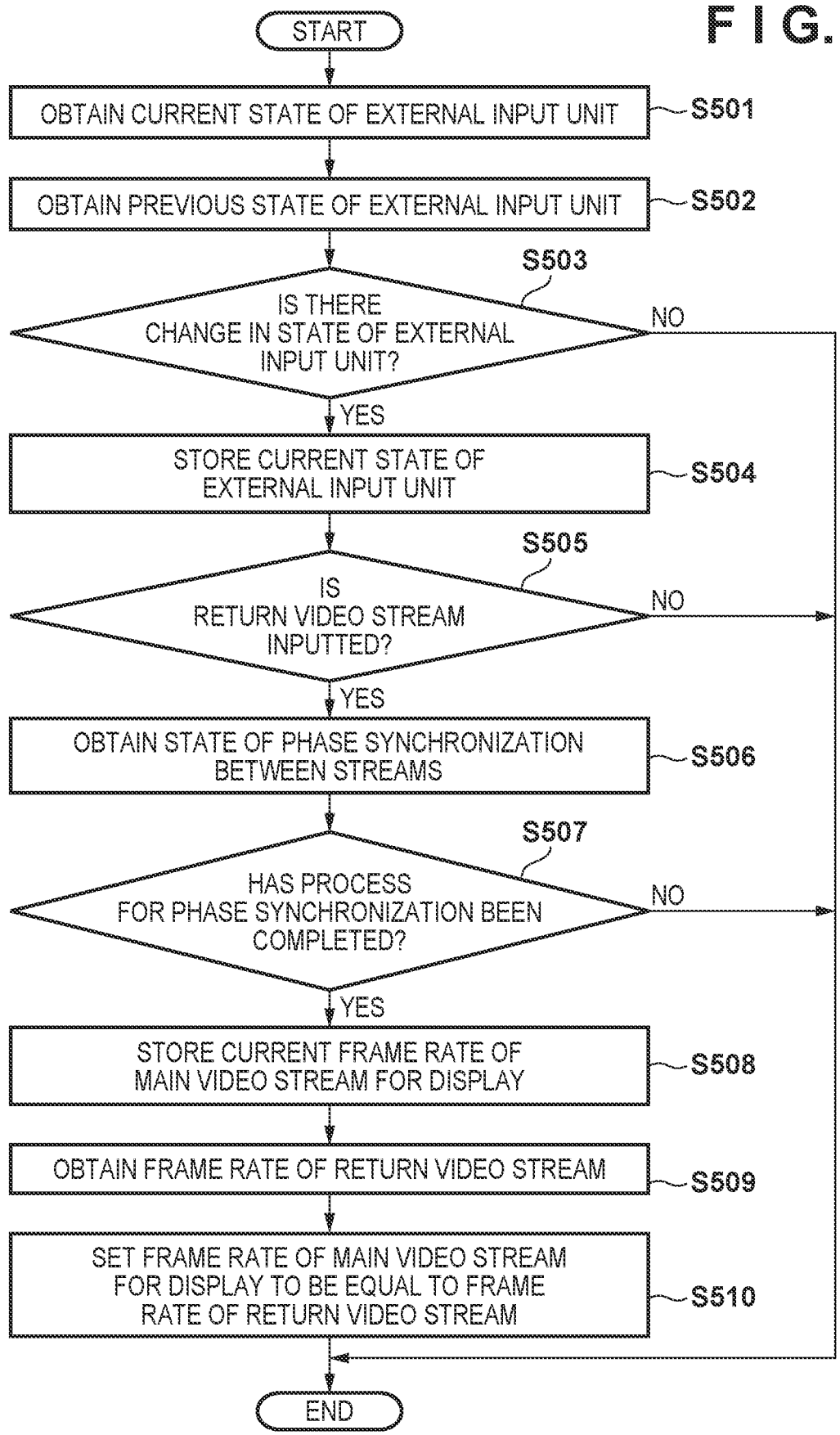
FIG. 5 is a flowchart showing an example of automatic control processing for a frame rate according to an embodiment.

Next, using a flowchart shown in FIG. 5, a description is given of processing in which the CPU 101 performs automatic control on the frame rate of a main video stream of the image capture apparatus 100.

Note that the frame rate of the main video stream may be set by a user, instead of being under automatic control by the CPU 101. Whether to place the frame rate of the main video stream under automatic control or under user settings may be changeable by the user via, for example, a menu screen.

In a case where the frame rate of the main video stream is placed under automatic control, the CPU 101 causes the frame rate of the main video stream to coincide with the frame rate of a return video stream if the return video stream has been input, or if the phase synchronization between the return video stream and the main video stream has been completed.

Automatic control processing for the frame rate of the main video stream can be executed at various timings. For example, these timings include, but are not limited to, the time of activation of the image capture apparatus 100, the time of configuration of a setting related to the output of the return video stream, the time of detection of the input of the return video stream to the external input unit 111, a user operation performed via a menu screen, and so forth.

In step S501, the CPU 101 obtains the current state of the external input unit 111.

Next, in step S502, the CPU 101 reads in a previous state of the external input unit 111 that was stored into the memory 102 in step S504 that has been executed most recently. The CPU 101 may read in the previous state of the external input unit 111 from the nonvolatile memory 103 or the recording medium 109. Furthermore, for example, in a case where the previous state of the external input unit 111 does not exist, the CPU 101 may skip step S502 and execute step S503.

In step S503, the CPU 101 compares the current state of the external input unit 111 obtained in step S501 with the previous state of the external input unit 111 obtained in step S502, and determines whether they are the same. If it is determined that they are the same (the state of the external input unit 111 has not changed), the CPU 101 ends the automatic control processing without changing the frame rate of the main video stream. On the other hand, if it is determined that they are not the same (the state of the external input unit 111 has changed), the CPU 101 executes step S504. Note that in a case where step S502 has not been executed, or in a case where the previous state of the external input unit 111 was not able to be obtained in step S502, the CPU 101 regards that the return output setting has changed, and executes step S504.

In step S504, the CPU 101 updates the previous state of the external input unit 111 stored in the memory 102 (or the nonvolatile memory 103 or the recording medium 109) using the current state of the external input unit 111 obtained in step S501. In a case where the previous state of the external input unit 111 is not stored, it is sufficient to simply store the current state of the external input unit 111. Note that in a case where step S502 is not executed, step S504 may not be executed, either.

Figure 7A:
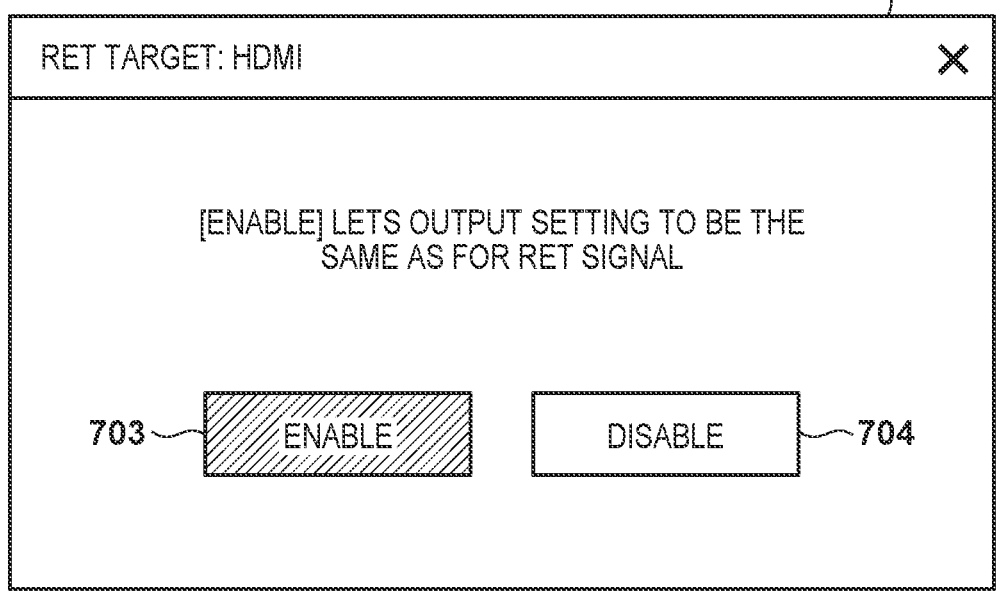
FIGS. 7A and 7B are diagrams showing examples of an external output setting screen according to an embodiment.
Figure 7B:
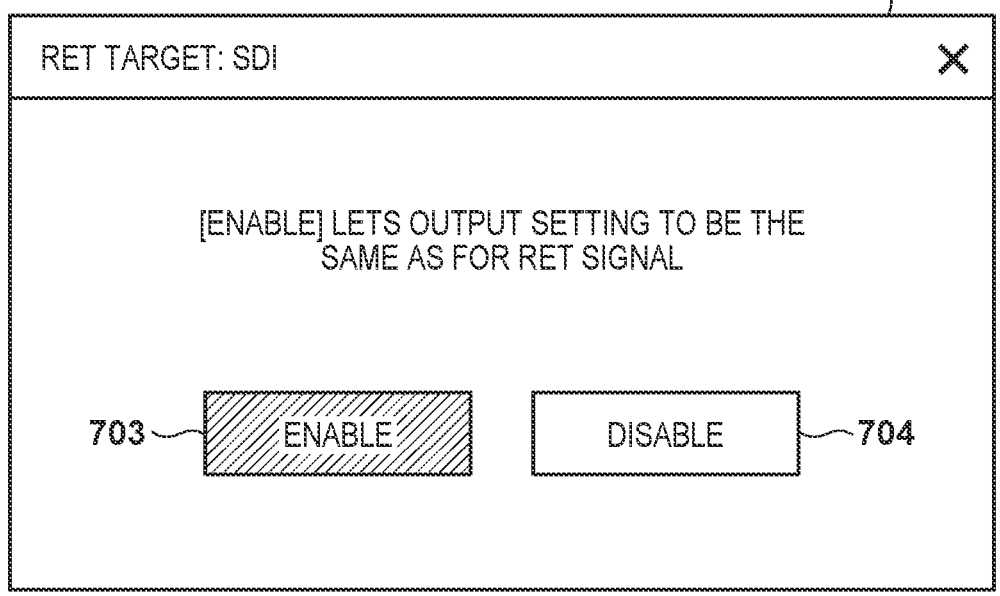

In step S505, the CPU 101 determines whether the return video stream has been input in the current state of the external input unit 111 obtained in step S501, and further determines whether the output of the return video stream has been set to be enabled on a return output setting screen of FIGS. 7A and 7B. If it is determined that the return video stream has been input and the output of the return video stream has been set to be enabled, the CPU 101 executes step S506; if it is not thus determined, the automatic control processing is ended without changing the frame rate of the main video stream.

In step S506, the CPU 101 obtains the state of synchronization between the phase of the main video stream and the phase of the return video stream.

In step S507, the CPU 101 determines whether processing for phase synchronization between the main video stream and the return video stream has been completed based on the state of synchronization obtained in step S506. If it is determined that the processing for phase synchronization between the main video stream and the return video stream has been completed, the CPU 101 executes step S508; if it is not thus determined, the automatic control processing is ended without changing the frame rate of the main video stream.

In step S508, the CPU 101 stores the current frame rate of the main video stream into the memory 102 (or the nonvolatile memory 103 or the recording medium 109). Note that the CPU 101 may skip processing of step S508 and execute step S509.

In step S509, the CPU 101 obtains the frame rate of the return video stream that has been input to the external input unit 111. Note that the frame rate of the return video stream can be obtained from the return video stream that has been input to the external input unit 111. Furthermore, the frame rate of the return video stream that has been obtained may be stored into the nonvolatile memory or the recording medium 109, and the stored frame rate may be referenced from the next time. In addition, the frame rate of the return video stream may be input by the user. The CPU 101 may obtain the frame rate of the return video stream using other methods.

In step S510, the CPU 101 sets the frame rate of the main video stream to be equal to the frame rate of the return video stream obtained in step S509. Thereafter, the CPU 101 ends processing for setting the frame rate on the image capture apparatus 100. Note that after the frame rate of the main video stream has been set to be equal to the frame rate of the return video stream, the phases of the main video stream and the return video stream can be asynchronous. In this case, the CPU 101 may restore the frame rate of the main video stream to the frame rate stored in step S508.

Figure 6:
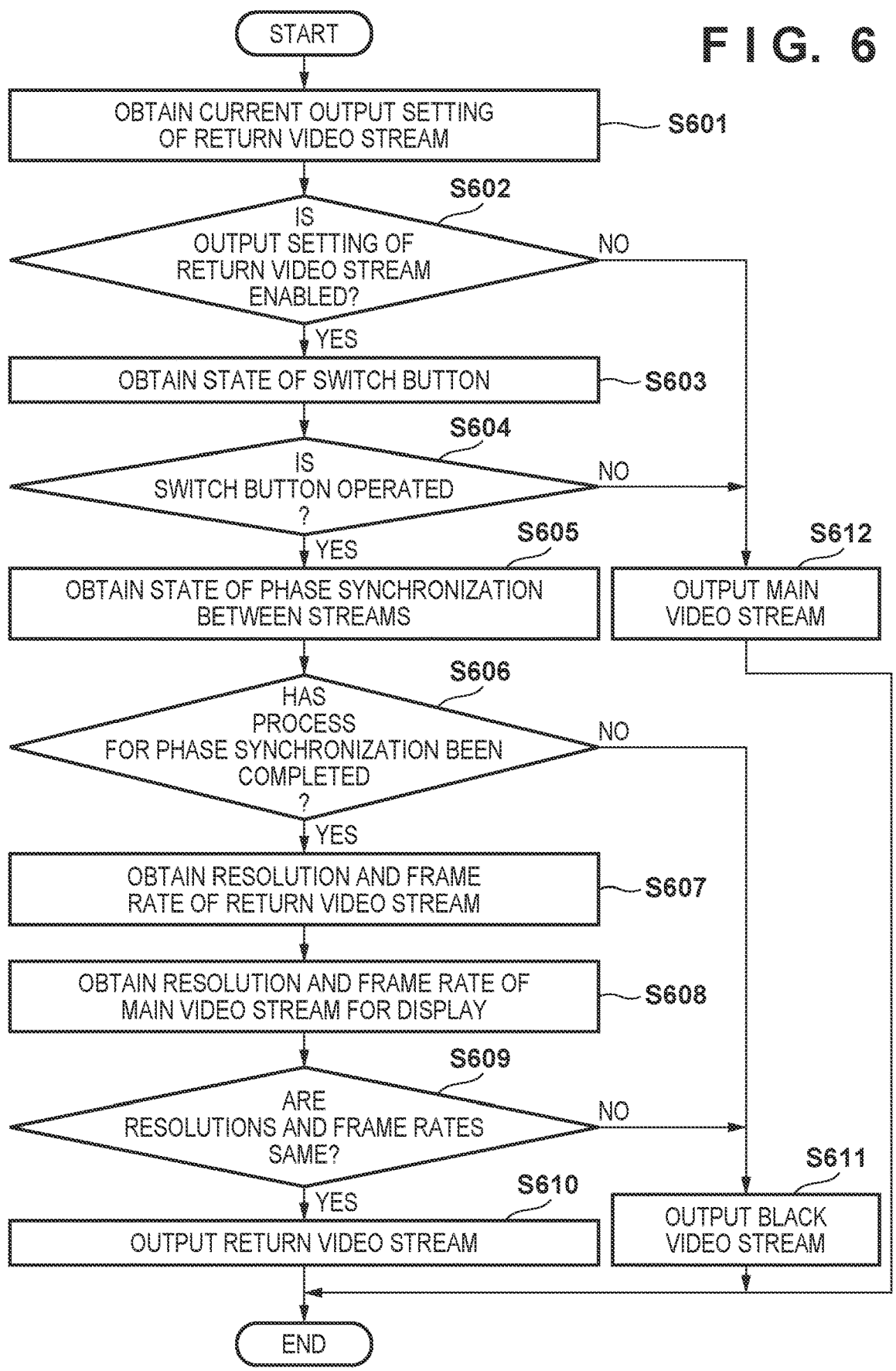
FIG. 6 is a flowchart showing an example of display control processing according to an embodiment.

Next, using a flowchart shown in FIG. 6, a description is given of display control processing for a main video stream and a return video stream on the image capture apparatus 100. In a case where a plurality of display apparatuses can be used, this processing can be executed for each display apparatus. This processing can be executed repeatedly in a state where an operation on the switching button 107 can be accepted, such as in a shooting standby state, during the execution of shooting for recording, and so forth.

In step S601, the CPU 101 reads in a current return output setting stored in the memory 102, similarly to step S401. Note that the CPU 101 may read in the current return output setting from the nonvolatile memory 103 or the recording medium 109.

In step S602, the CPU 101 determines whether the current return output setting obtained in step S601 is "enabled"; it executes step S603 if it is determined that the return output setting is enabled, and executes step S612 if it is not thus determined.

In step S603, the CPU 101 reads in the state of the switching button 107.

In step S604, the CPU 101 determines whether the switching button 107 is operated (e.g., depressed) based on the state of the switching button 107 that has been read in in step S603. The CPU 101 executes step S605 if it is determined that the switching button 107 has been operated, and executes step S612 if it is not thus determined.

In the present embodiment, it is assumed that control is performed so that the return video stream is displayed while the switching button 107 is operated, and the main video stream is displayed while the switching button 107 is not operated. The correspondence relationship between an operation on the switching button 107 and a video stream to be displayed may be reversed. Furthermore, it is possible to switch between the return video stream and the main video stream each time the switching button 107 is depressed. In either case, the CPU 101 executes step S605 in a case where the return video stream is displayed, and executes step S612 in a case where the main video stream is displayed.

In step S605, the CPU 101 obtains the state of synchronization between the phase of the main video stream and the phase of the return video stream.

In step S606, the CPU 101 determines whether processing for phase synchronization between the main video stream and the return video stream has been completed based on the state of synchronization obtained in step S605. The CPU 101 executes step S607 if it is determined that the processing for phase synchronization between the main video stream and the return video stream has been completed, and executes step S611 if it is not thus determined.

In step S607, the CPU 101 obtains the resolution and the frame rate of the return video stream that has been input to the external input unit 111.

In step S608, the CPU 101 obtains the resolution and the frame rate of the main video stream for display.

In step S609, the CPU 101 compares the resolution and the frame rate of the return video stream obtained in step S607 with the resolution and the frame rate of the main video stream for display obtained in step S608, and determines whether the resolutions and the frame rates are the same. The CPU 101 executes step S610 if it is determined that the return video stream and the main video stream for display have the same resolution and frame rate, and executes step S611 if it is not thus determined. In a case where the automatic control processing for the resolution and the frame rate is in execution by way of processing of FIG. 4 and FIG. 5, the return video stream and the main video stream for display are in a state where they have the same resolution and frame rate. In step S610, the CPU 101 starts outputting the return video stream that has been input to the external input unit 111 to the display 105 or an external display apparatus connected to the external output unit 112. It is assumed that the display apparatus to which the return video stream is output is determined in accordance with, for example, a terminal to which the return video stream has been input in the external input unit 111. Then, the CPU 101 ends the display control processing. Note that the CPU 101 may repeat processing from step S604. As the return video stream and the main video stream for display have the same resolution and frame rate, the main video stream can be quickly switched to the return video stream without executing conversion processing and the like.

In step S611, the CPU 101 starts outputting a preset video stream (e.g., a black video stream), which is neither the return video stream nor the main video stream, to the display 105 or the external display apparatus connected to the external output unit 112. This preset video stream indicates that the return video stream cannot be displayed. A message indicating that the return video stream cannot be displayed may be displayed in place of the black video stream, or may be superimposed over the black video stream displayed. Note that the CPU 101 may execute step S612 instead of step S611. In this case, as the displayed video stream is not switched by an operation on the switching button 107, the CPU 101 superimposes and displays a message indicating that the return video stream cannot be displayed over the main video stream. The return video stream may be output in response to the completion of the processing for phase synchronization.

In step S612, as the output of the return video stream has been set to be disabled, the CPU 101 outputs the main video stream for display to the display 105 or the external display apparatus connected to the external output unit 112. Then, the CPU 101 ends the display control processing. Note that the CPU 101 may repeat processing from step S604.

FIGS. 7A and 7B show examples of a return output setting screen, which is a part of a menu screen that is displayed by the image capture apparatus 100 on the display 105. Via the return output setting screen, the user can set whether to enable or disable the output of the return video stream input to the external input unit 111 with respect to an external display apparatus connected to the external output unit 112. The setting can be configured for each interface (output terminal) included in the external output unit 112. On the return output setting screen, first, an interface selection screen (not shown) is displayed. On the interface selection screen, the interfaces that can be set as an output target of the return video stream, as well as the current setting about whether the output of the return video stream is enabled/disabled, is displayed.

By operating the operation unit 106, the user selects an interface for which the setting about whether the output of the return video stream is enabled/disabled is to be changed. Once the interface has been selected, a screen corresponding to the selected interface for setting the output of the return video stream to be enabled/disabled is displayed. In the present embodiment, it is assumed that the external output unit 112 includes one HDMI terminal and one SDI terminal. A return output setting screen 701 shown in FIG. 7A is a screen for setting the output of the return video stream to be enabled/disabled with respect to the HDMI terminal. Meanwhile, a return output setting screen 705 shown in FIG. 7B is a screen for setting the output of the return video stream to be enabled/disabled with respect to the SDI terminal.

In step S611, the CPU 101 starts outputting a preset video stream (e.g., a black video stream), which is neither the return video stream nor the main video stream, to the display 105 or the external display apparatus connected to the external output unit 112. This preset video stream indicates that the return video stream cannot be displayed. A message indicating that the return video stream cannot be displayed may be displayed in place of the black video stream, or may be superimposed over the black video stream displayed. Note that the CPU 101 may execute step S612 instead of step S611. In this case, as the displayed video stream is not switched by an operation on the switching button 107, the CPU 101 superimposes and displays a message indicating that the return video stream cannot be displayed over the main video stream.

In step S612, the CPU 101 outputs the main video stream for display to the display 105 or the external display apparatus connected to the external output unit 112. Then, the CPU 101 ends the display control processing. Note that the CPU 101 may repeat processing from step S604.

FIGS. 7A and 7B show examples of a return output setting screen that is displayed by the image capture apparatus 100 on the display 105. Via the return output setting screen, the user can set whether to enable or disable the output of the return video stream input to the external input unit 111 with respect to an external display apparatus connected to the external output unit 112. The setting can be configured for each interface (output terminal) included in the external output unit 112. It is assumed here that the external output unit 112 includes one HDMI terminal and one SDI terminal. A return output setting screen 701 shown in FIG. 7A is a screen for configuring a setting with respect to the HDMI terminal. Meanwhile, a return output setting screen 705 shown in FIG. 7B is a screen for configuring a setting with respect to the SDI terminal.

The CPU 101 places one of an "enable" button 703 and a "disable" button 704 in a selected state in accordance with, for example, an operation on a direction key or a touch panel included in the operation unit 106. Then, the CPU 101 sets a value corresponding to the button that is in the selected state at the time of detection of, for example, an operation on a determination button included in the operation unit 106.

As described above, in a case where the output of the return video stream has been set to be "enabled" (a state where the return video stream can be displayed on the display apparatus), the resolution of the main video stream for display is changed to be the same as the resolution of the return video stream. As a result, when a video stream displayed on the display apparatus is switched between the main video stream and the return video stream, the conversion of resolutions of the video streams and the display apparatus does not occur. Therefore, the video streams can be quickly switched, and the usability is improved.

Other Embodiments

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-118874, filed on Jul. 26, 2022, which is hereby incorporated by reference herein in its entirety.

What is claimed is:

1. An image capture apparatus, comprising:
   an image sensor;
   an output interface that selectively outputs a main video stream obtained using the image sensor and a sub video stream input from outside; and
   one or more processors that execute a program stored in a memory and thereby function as a control unit configured to:
   change a resolution of the main video stream to be equal to a resolution of the sub video stream in a case where an output of the sub video stream from the output interface has been set to be enabled, and
   not change the resolution of the main video stream in a case where the output of the sub video stream from the output interface has not been set to be enabled.

2. The image capture apparatus according to claim 1, wherein
   the one or more processors further function as:
   a setting unit configured to set the output of the sub video stream from the output interface to be enabled; and
   an instruction unit configured to input a switching instruction for switching a video stream output from the output interface from the main video stream to the sub video stream, and
   the control unit performs control so that the main video stream is output from the output interface at a resolution equal to the resolution of the sub video stream when the setting unit has set the output of the sub video stream to be enabled, and performs control so that the sub video stream is output from the output interface when the switching instruction has been input from the instruction unit in a state where the setting unit has set the output of the sub video stream to be enabled.

3. The image capture apparatus according to claim 1, wherein the control unit further changes a frame rate of the main video stream to be equal to a frame rate of the sub video stream in a case where the output of the sub video stream from the output interface has been set to be enabled, and does not change the frame rate of the main video stream in a case where the output of the sub video stream from the output interface has not been set to be enabled.

4. The image capture apparatus according to claim 3, wherein the control unit changes the frame rate of the main video stream to be equal to the frame rate of the sub video stream of a state where processing for phase synchronization between the main video stream and the sub video stream has been completed.

5. The image capture apparatus according to claim 3, wherein the one or more processors further function as an instruction unit configured to input a switching instruction for switching a video stream output from the output interface from the main video stream to the sub video stream, and if the switching instruction has been input from the instruction unit, the control unit performs control to switch to the sub video stream in a case where the frame rate of the main video stream has been changed to be equal to the frame rate of the sub video stream, and performs control to switch to a specific video stream, instead of the sub video stream, in a case where the frame rate of the main video stream has not been changed to be equal to the frame rate of the sub video stream.

6. The image capture apparatus according to claim 1, wherein in a case where a plurality of output interfaces are included in the image capture apparatus, the control unit controls a video stream to be output for each of the output interfaces.

7. The image capture apparatus according to claim 1, wherein the output interface outputs the main video stream and the sub video stream to the same display apparatus.

8. The image capture apparatus according to claim 1, wherein in a case where a display apparatus is not connected to the output interface, the control unit does not control a video stream output from the output interface.

9. The image capture apparatus according to claim 1, wherein in a case where a setting has been configured whereby a resolution of a video stream output from the output interface is linked to a resolution of a display apparatus connected to the output interface, the control unit disables the setting, and then changes the resolution of the main video stream to be equal to the resolution of the sub video stream.

10. The image capture apparatus according to claim 1, wherein in a case where an extension unit to which the main video stream and the sub video stream are input is connected to the image capture apparatus, the control unit performs, for a video stream output from an output interface included in the extension unit, the same control as that for a video stream output from the output interface included in the image capture apparatus.

11. The image capture apparatus according to claim 1, wherein in a case where a setting of the output of the sub video stream from the output interface has changed from enabled to disabled, the control unit restores the resolution of the main video stream to the resolution of the main video stream before having been changed to be equal to the resolution of the sub video stream.

12. A control method executed by an image capture apparatus that includes an image sensor and an output interface that selectively outputs a main video stream obtained using the image sensor and a sub video stream input from outside, the control method comprising:

determining whether an output of the sub video stream from the output interface has been set to be enabled;

changing a resolution of the main video stream to be equal to a resolution of the sub video stream in a case where it is determined that the output of the sub video stream from the output interface has been set to be enabled; and making no change to the resolution of the main video stream in a case where it is determined that the output of the sub video stream from the output interface has not been set to be enabled.

13. A non-transitory computer-readable medium storing a program for causing, when executed by a computer included in an image capture apparatus that includes an image sensor and an output interface that selectively outputs a main video stream obtained using the image sensor and a sub video stream input from outside, the computer to execute a control method comprising:

determining whether an output of the sub video stream from the output interface has been set to be enabled;

changing a resolution of the main video stream to be equal to a resolution of the sub video stream in a case where it is determined that the output of the sub video stream from the output interface has been set to be enabled; and making no change to the resolution of the main video stream in a case where it is determined that the output of the sub video stream from the output interface has not been set to be enabled.

* * * * *